United States Patent [19]
Linner

[11] 3,781,563
[45] Dec. 25, 1973

[54] RADIATION DETECTOR
[75] Inventor: Leslie Richard Linner, Minnetonka, Minn.
[73] Assignee: Honeywell Inc., Minneapolis, Minn.
[22] Filed: Jan. 29, 1973
[21] Appl. No.: 327,535

Related U.S. Application Data
[63] Continuation of Ser. No. 156,741, June 25, 1971, abandoned.

[52] U.S. Cl. .................................... 250/362, 328/6
[51] Int. Cl. ............................................. G01n 27/00
[58] Field of Search ................. 328/6; 250/372, 373

[56] References Cited
UNITED STATES PATENTS
3,348,104  10/1967  Zielinski et al. ...................... 328/6
3,488,492  1/1970  Niksarian ............................. 250/372
3,286,093  11/1966  Gilbert ................................. 250/372
3,387,135  6/1968  Engh .................................... 250/374

Primary Examiner—Harold A. Dixon
Attorney—Lamont B. Koontz et al.

[57] ABSTRACT

A radiation detector employs two internal ionization type radiation sensors in a circuit such that one sensor aids the other in detection of radiation while each limits the effects of a failure of the other sensor.

5 Claims, 4 Drawing Figures

PATENTED DEC 25 1973 3,781,563
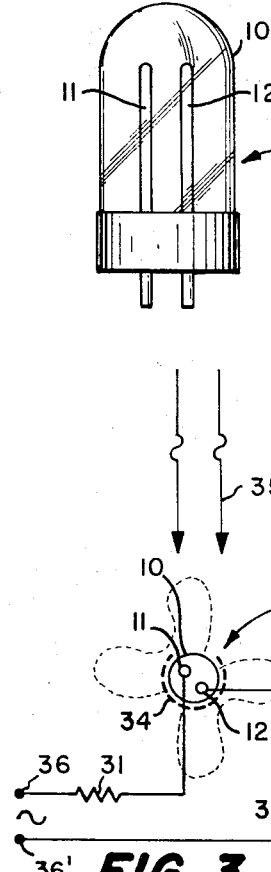
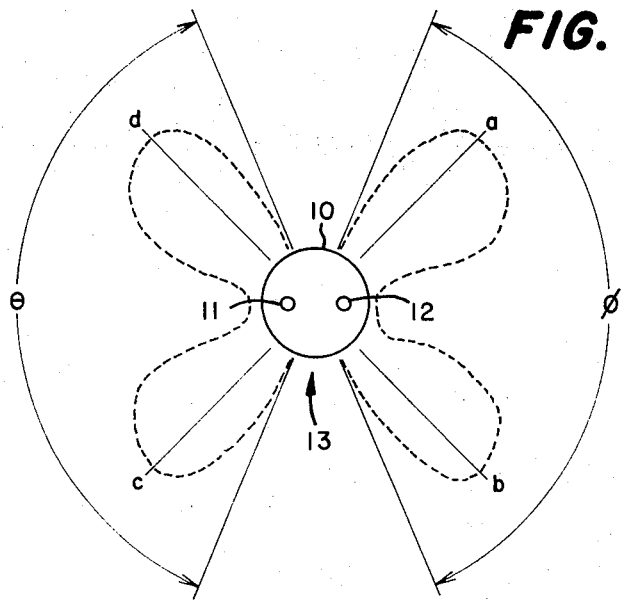
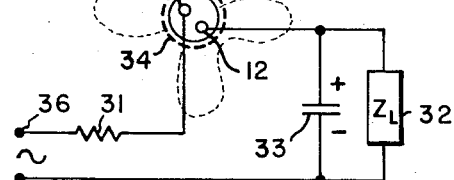
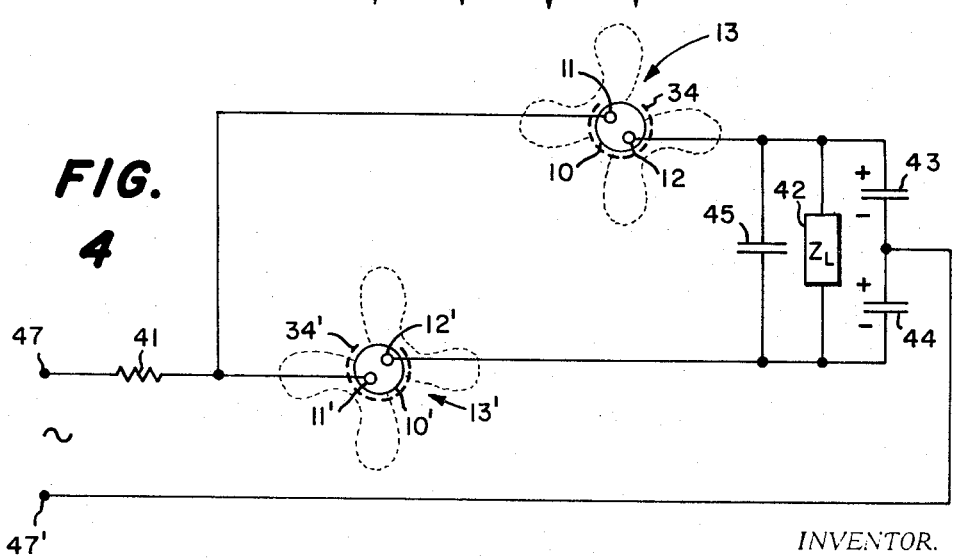
INVENTOR.
LESLIE RICHARD LINNER
BY Osmund A. Dahle
ATTORNEY.

RADIATION DETECTOR

This is a continuation of application Ser. No. 156,741, filed June 25, 1971, and now abandoned.

BACKGROUND OF THE INVENTION

A radiation sensor the operation of which depends on internal ionization and which has a directional sensing capability has been shown to be useful in radiation monitoring circuits since such a sensor leads to the possibility of self-checking performance. Such a sensor for ultraviolet (UV) radiation and some applications for it are shown in U.S. Pat. No. 3,488,492, issued to R. J. Niksarian on Jan. 6, 1970. Operation of the sensor requires that a voltage be applied to cause one electrode to be at a voltage potential above a breakdown potential with respect to another electrode. Should UV radiation impinge on the sensor in such a condition the radiation will be effective to cause a breakdown ionization of the atmosphere contained in the sensor permitting current to flow from the high potential electrode to the low potential electrode. After such an ionization the potential drop between the electrodes will fall till it equals a sustaining potential sufficient to maintain conduction.

If the sensitivity of such a sensor to impinging UV radiation, when each electrode is raised to a sufficient potential in turn, is measured as a function of the angle around the sensor in a plane perpendicular to the electrodes within the sensor, it is found that at least two mutually exclusive angular ranges of appreciable sensitivity exist. In these angular ranges UV radiation impinging on the sensor will cause conduction between high and low potential electrodes. Each angular range so found can be related to a particular electrode having a voltage potential applied to it with respect to another electrode in excess of the required breakdown potential.

Further, the ability to sense in these angular ranges can be made to exist at time durations alternate to one another by applying to alternate electrodes, one in each such time duration, a voltage potential with respect to another electrode in excess of the breakdown potential required by the sensor. Applying a periodic, alternating voltage, sinusoidal or otherwise, of sufficient magnitude between two electrodes is a convenient way to alternate the ability to sense between two such angular ranges associated with the electrodes.

One of the applications of such a sensor suggested by the Niksarian patent is as a radiation presence detector. To achieve the self-checking feature available with the use of this kind of sensor the patent indicates restricting the radiation sensor so only a portion of its sensing area is exposed to a region from which UV radiation can be detected. The portion of the sensor exposed occurs along one of the two angular ranges wherein the ability to sense radiation can be made to exist. The other angular range is unexposed to radiation. If voltage is supplied in alternate time durations to the electrodes such that at first sensing is made possible in the angular range containing the exposed portion and then sensing is made possible in the unexposed angular range, the sensor checks both whether there is radiation impinging from the monitored region and the sensor ability to note the lack of impinging radiation. It is important that such self-checking occur since an occasional sensor of this kind may go into a runaway condition, i.e., passing current from a higher potential electrode to a lower potential electrode despite no UV radiation impinging upon the sensor.

A sensor applied as above, periodically sensing alternatively between two angular ranges with one range unexposed to and the other range exposed to a radiation source to be monitored, is the equivalent of using a sensor as a radiation dependent current rectifying component in the associated electrical circuit. The sensor rectifies electrical current by ionizing only in one portion of the period of the supplied voltage and only when there is impinging radiation from the direction which is monitored. Without impinging radiation the sensor is a high impedance in the associated circuit. This rectification property may be used to provide a direct voltage across a capacitor placed in series with the sensor. The occurrence of a sufficient direct voltage on the capacitor indicates there is UV radiation impinging on the sensor.

The use of a single sensor to do this, however, has drawbacks. The buildup of the DC voltage on the capacitor, indicating the impinging radiation, may be relatively slow since such sensors will occasionally ionize even though the applied voltage is such during that portion of the period that only the unexposed angular range has been made sensitive to sensing UV radiation. This permits a reverse current to flow, thus reducing the direct voltage buildup. A diode used in series with the sensor to block the resulting wrong direction current flow puts a rectifying component in the circuit in addition to the sensor. Then if a runaway condition should occur in the sensor being used in the circuit there would be a direct voltage occurring across the capacitor indicating UV radiation impinging on the sensor though in fact no such radiation may be so impinging.

Such sensors occasionally fail in the runaway condition and will in so failing be found, in a few instances, in a rectifying runaway condition. This rectifying runaway condition rarely occurs but when it does the sensor will have, rather than equal conduction between the electrodes in each direction when alternating voltage is applied despite no radiation impinging on the sensor, a tendency to conduct to a lesser extent in one direction, i.e., exhibit a rectification tendency. The result is a direct voltage may occur across the series capacitor falsely indicating impinging radiation upon the sensor.

SUMMARY OF THE INVENTION

The invention herein employs two sensors each in series with a capacitor to form two circuit branches, the branches being connected in parallel in the circuit. The sensors are both exposed to the region from which radiation is to be detected in one angular range wherein the ability to sense impinging UV radiation can be made to exist and not exposed to radiation along the other associated angular range in which the ability to sense can be made to exist.

The two circuit junctions formed by the connected branches have a sufficient periodic, alternating voltage applied between the members so that with the sensor properly connected one sensor is capable of sensing impinging radiation from the direction being monitored while the other sensor is sensing only in its unexposed angular range. A direct voltage, threshold sensing load is connected between the junction of one capacitor and sensor and the junction of the other capacitor and junction.

Among the advantages of the invention is the direct voltage buildup on the capacitors indicating radiation impinging on the sensors is supplied to the load on both polarity portions of the period of the applied AC voltage. Also the lower sustaining voltage of the sensor monitoring radiation actually impinging in one polarity portion of the period of the applied alternating voltage limits the voltage applied to the other sensor that would permit it to sense in the shielded angular range at the same time substantially reducing the liklihood of its passing any current in the reverse direction. Further, the failure of either one of the sensors will not permit a sufficient direct voltage buildup indicating impinging UV radiation falsely.

BRIEF DESCRIPTION OF THE DRAWING

FIG. 1 is a pictorial representation of a directionally sensitive radiation sensor of the kind used in this invention, FIG. 2 is a diagram of the directional sensitivity of the radiation sensor in a plane perpendicular to the axis of the sensor, FIG. 3 is a schematic diagram of a basic single sensor radiation detection circuit, and FIG. 4 is a schematic diagram of a two sensor radiation detection circuit.

DESCRIPTION OF THE PREFERRED EMBODIMENTS

FIG. 1 shows a directionally sensitive radiation sensor of the kind discussed in the Niksarian patent which in turn is of the general type disclosed in U.S. Pat. No. 3,344,302 issued to R. O. Engh and R. G. Johnson. The modification of the electrode structure, composed of electrodes 11 and 12 within glass envelope 10, as discussed in the Niksarian patent must also be employed in the radiation sensors for use in the present invention to provide the directional sensitivity.

FIG. 2 presents a diagram of the sensitivity characteristics of the radiation sensor in a plane perpendicular to the sensor axis, i.e., a direction generally paralleling the length of the electrodes 11 and 12 within the glass envelope 10. In this diagram, taking the center of the sensor as the origin of radial coordinates, sensitivity is plotted on the radial coordinate versus the angle measured around the origin.

The sensor is capable of sensing impinging UV radiation whenever the voltage potential on one electrode with respect to the other electrode exceeds a breakdown potential. Thus, two sensitivity lobes result and are shown in FIG. 2, one occurring when the voltage potential on electrode 11 exceeds that on electrode 12 by the breakdown potential and the other occurring when the voltage on electrode 12 so exceeds that on electrode 11.

Each lobe is found to be confined within an angular range mutually exclusive to another angular range containing the other lobe. These mutually exclusive angular ranges are shown in FIG. 2 as theta ($\theta$) and phi ($\phi$). The lobe contained in each angular range exhibits two radials of maximum sensitivity. These are labeled by radials $a$, $b$, $c$, and $d$ in FIG. 2.

A basic single sensor radiation detecting circuit is shown in FIG. 3. Shield 34 around glass envelope 10 illustrates one of many possible methods restricting the area of exposure of radiation sensor 13 to impinging radiation, 35. If whatever radiation that is allowed to impinge on the sensor is substantially limited to impinging from one direction, no shield at all is required. If a shield is employed, its inner surface must be chosen such that impinging radiation passing through the sensor will not be reflected back into and through the sensor a second time. The radiation sensor 13 is oriented with respect to the impinging radiation, 35, in such a way that a radial of maximum sensitivity of one of the lobes is substantially aligned with the direction from which the radiation is impinging. The other such radials intersect shield 34. The electrodes of the radiation sensor are connected in an electrical circuit. Shown in series with the electrodes 11 and 12 is current limiting resistor 31 and capacitor 33, respectively. Terminals 36 and 36' are adapted to be connected to a periodic, alternating voltage supply. Impedance 32 is used to represent a direct voltage, threshold detecting device for detecting slowly changing voltages.

During the two portions of the period when the voltage supplied at terminals 36 and 36' has first one polarity and then the other, the magnitude of the voltage is chosen to exceed the breakdown potential of the radiation sensor for some duration of time in each portion. Under these conditions the radiation sensor will appear in circuit operation as a symmetrical high impedance in the absence of impinging radiation since there normally will be no ionization in the radiation sensor for a conduction mechanism by which current can be conducted. Upon impingement of radiation, 35, the radiation sensor exhibits asymmetrical current carrying capability, i.e., shows rectifying properties in the circuit. This occurs because the radiation sensor given impinging radiation will normally experience internal ionization and hence significant current conduction only during one portion of the period of the supplied alternating voltage. This will be the portion having the voltage polarity required to produce the sensitivity lobe having a radial aligned with the direction of the impinging radiation. In another portion of the period when the voltage polarity is reversed thus producing the other sensitivity lobe there will still not be any substantial ionization normally because shield 34 prevents any UV radiation from impinging on the sensor in the angular range containing that lobe.

A direct voltage will build up because of this rectifying action on capacitor 33 when UV radiation is impinging on the radiation sensor. Once ionization has substantially occurred the voltage drop across the radiation sensor will decrease rapidly from the breakdown potential to a value termed the sustaining potential which is several volts below the breakdown potential.

If the sensor orientation with respect to the impinging UV radiation is such that the higher or forward current flow during a portion of the period is from terminal 11 to terminal 12, terminal 12 can be designated as the forward terminal and terminal 11 designated as the reverse terminal. The direct voltage across capacitor 33 may be used to operate a detector as represented by impedance 32.

A limited ionization also occurs often in this type of radiation sensor during the portion of the period of the supplied alternating voltage which produces the shielded sensitivity lobe thereby permitting a limited current to flow from terminal 12 to terminal 11. Such a reverse current is in addition to expected very small leakage currents. This reverse current will slow the buildup of direct voltage on capacitor 33 which undesirably lengthens the time of response of the radiation detection system. The radiation sensor appears thus to be a relatively poor rectifier.

A further disadvantage of the circuit shown in FIG. 3 becomes evident when a radiation sensor fails in a runaway condition as one will occasionally. In such a runaway condition the radiation sensor experiences substantial ionization in both portions of the period of the supplied alternating voltage despite the lack of any impinging radiation. The radiation sensor then passes current in either direction even in the absence of impinging radiation. No radiation presence output will be indicated if the current conducted in either direction is relatively equal. However, if sufficiently unequal currents are conducted by the sensor being in a rectifying runaway condition, a direct voltage will buildup on capacitor 33. If a sufficient direct voltage builds up the radiation detection circuit will falsely indicate impinging radiation upon the sensor.

FIG. 4 shows a schematic diagram for overcoming the disadvantages of the circuit shown in the schematic in FIG. 3. Here two radiation sensors 13 and 13' are employed, one shown shielded by shield 34 around glass envelope 10 and the other by shield 34' around glass envelope 10'. Again such shields are not required when only highly directionalized radiation impinges on the sensor. The radiation sensor 13 within shield 34 is oriented with respect to the impinging radiation, 46, in the same relationship as shown for the radiation sensor and shield in FIG. 3. In this arrangement electrode 12 is again a forward electrode and electrode 11 a reverse electrode.

The radiation sensor 13' within shield 34' has an altered orientation with respect to the impinging radiation 46. This change in orientation has the effect of making terminal 11' the forward terminal and terminal 12' the reverse terminal.

Therefore there is a direct connection between reverse terminal 11 and forward terminal 11'. This direct connection is coupled through current limiting resistor 41 to terminal 47. Forward terminal 12 is connected to capacitor 43 and reverse terminal 12' is connected to capacitor 44. The other side of each of these capacitors is connected to 47'. Terminals 47 and 47' are adapted to be connected to a periodic, alternating voltage supply. Impedance 42 is used to represent a direct voltage threshold detecting device for slowly changing voltages. Capacitor 45 may be used to smooth out changes in voltage occurring across impedance 42.

In normal operation, once again both radiation sensors, 13 and 13', appear as symmetrical, high impedances in the absence of impinging UV radiation. With impinging radiation, each radiation sensor again appears in the circuit to be a rectifying component. However, in the circuit of FIG. 4 for a given polarity of input voltage at a value exceeding the breakdown potential, one radiation sensor will be carrying a forward current with only a sustaining potential dropped across it. At the same time the circuit topology serves to limit the other sensor to conduct only leakage and reverse currents. This occurs because each voltage supply terminal is coupled to a forward terminal of one sensor and a reverse terminal of the other sensor so when one sensor is permitted to sense in its exposed range the other sensor senses in its unexposed or shielded range.

From this sensor-circuit arrangement a particular advantage ensues in the elimination of the reverse current beyond the very small leakage currents. This elimination does much to remove one of the disadvantages of the circuit shown in the schematic of FIG. 3 mentioned above — the discharge of the direct voltage buildup on the capacitor during reverse polarity portions of the period of the supplied voltage. There are two reasons for this result, the important one of which is always effective. The first reason is due to two characteristics of forward conducting sensors: (1) the strong tendency of the forward conducting sensor to ionize at a smaller magnitude than the reverse conducting sensor in the voltage supply period, i.e., to conduct first in the period; and (2) that the sustaining potential of the forward conducting sensor is several volts less than the breakdown potential the reverse conducting sensor thus serving to limit the voltage drop across the reverse conducting sensor. Thereby in the usual situation with the characteristics of both sensors in a pair being similar the voltage drop across a later ionizing sensor does not reach the breakdown potential by use of this circuit.

The other and more important reason is that when two sensors of this internal ionization type are connected in parallel and one has ionized due to impinging radiation, the other sensor is found not to ionize even if the two sensors have characteristics so mismatched that the sustaining potential of the sensor ionized exceeds the breakdown potential of the other. Such a situation can occur whenever the sensor orientation and the radiation impingement are such that the high breakdown and sustaining potentials sensor ionizes prior to the other sensor. The shunting of the sensor not in ionization by the sensor that is in ionization prevents conduction from being initiated beyond any very small leakage currents in the sensor not in ionization.

Coming back to the description of normal operation, during a single polarity portion of the period of the voltage supply at a point (1) when the voltage supplied exceeds the breakdown potential, and (2) when UV radiation is impinging on the radiation sensors, radiation sensor 13 will carry a forward current. This current will pass through capacitor 43 and also through the series combination of capacitor 45 and the parallel circuit of impedance 42 with capacitor 45. This current will positively charge capacitors 43 and 45 while discharging somewhat, capacitor 44 with respect to the polarities shown. Under similar conditions in the other polarity portion of the period, radiation sensor 13' will carry a forward current. This current will pass through capacitor 44 and also through the series combination of capacitor 43 and the parallel circuit of impedance 42 with capacitor 45. This current will charge capacitors 44 and 45 while discharging somewhat capacitor 43. Thus, a net direct voltage builds in sum across capacitors 43 and 44 and so across impedance 42. However, in the absence of UV radiation the radiation sensors appear in the circuit as symmetrical, high impedances and prevent any significant direct voltage from appearing on capacitors 43 and 44.

A further advantage of this circuit arrangement is the prevention of a false signal which would indicate impinging UV radiation upon the radiation sensors as a result of one of the radiation sensors failing in a rectifying runaway condition. This can be understood best by assuming that only one of the radiation sensors in the schematic of FIG. 4 is performing in the circuit as a rectifier while the other one remains a symmetrical high impedance in the absence of impinging UV radiation. If this high impedance is viewed as equivalent of an open circuit for present purposes, it is immediately seen that the other radiation sensor in performing in failure as a rectifier charges capacitors 43 and 44 so only the difference in voltage on the capacitors is across impedance 42 rather than the sum. Further, within a few cycles as steady state is reached, only an alternating voltage will appear across impedance 42 and no direct voltage component. If now the open circuit assumption is dropped, this same result will be seen to be obtained so long as the correctly operating radiation sensor maintains the characteristic high impedance such a sensor normally has in the absence of impinging radiation. Only in the event of both radiation sensors going into a runaway condition simultaneously is it possible for a net DC voltage of sufficient magnitude buildup on capacitors 43 and 44 to falsely indicate impinging radiation on the sensors. To this requirement, an already extremely unlikely possibility, there is a further requirement added which is also unlikely to be met of the two sensors having nearly identical characteristics. This further requirement must be satisfied for otherwise one of the runaway sensors will, in shunting the other, prevent conduction from being initiated in that other sensor. This prevention of conduction effect discussed above is also found to occur when both sensors in shunt are in the runaway condition.

The example of the invention herein involved ultraviolet radiation but it is to be understood that a radiation sensor depending on internal ionization with the proper sensitivity directionability characteristic may be useable for monitoring other types of radiation in this invention.

The embodiments of the invention in which an exclusive property or right is claimed are defined as follows:

1. A system for directional radiation detection employing radiation sensors which have a voltage controlled directional sensitivity, the system comprising:

two radiation sensors each having electrical current rectification capability between a forward and a reverse terminal thereof when irradiated upon at least one sensor surface area and each oriented with said sensor surface area facing a predetermined direction from which radiation is to be detected, two capacitors each having a first and second terminal with said first terminal of one of said capacitors electrically joined in series with said forward terminal of one of said sensors and said first terminal of other said capacitor electrically joined in series with said reverse terminal of other said sensor, and first and second power terminals adapted to receive an alternating voltage with said first power terminal electrically connected through a first connection means both to said forward terminal heretofore unjoined and to said reverse terminal heretofore unjoined and with said second power terminal electrically connected through a second connection means to each said second terminal of said capacitors.

2. The system of claim 1 wherein a threshold voltage sensitive detection means responsive only to voltages of frequencies below a frequency of said alternating voltage supply is connected between said first terminals of said capacitors.

3. The system of claim 1 wherein a current limiting resistor is placed in series with said alternating voltage supply.

4. The system of claim 1 wherein said sensors are ultraviolet radiation detection tubes.

5. The system of claim 4 wherein a threshold voltage sensitive detection means responsive only to voltages of frequencies below a frequency of said alternating voltage supply is connected between said first terminals of said capacitors.

* * * * *